Jan. 20, 1953 E. W. FORNEY 2,625,906
EGG TURNING APPARATUS FOR INCUBATORS
Filed Feb. 28, 1951
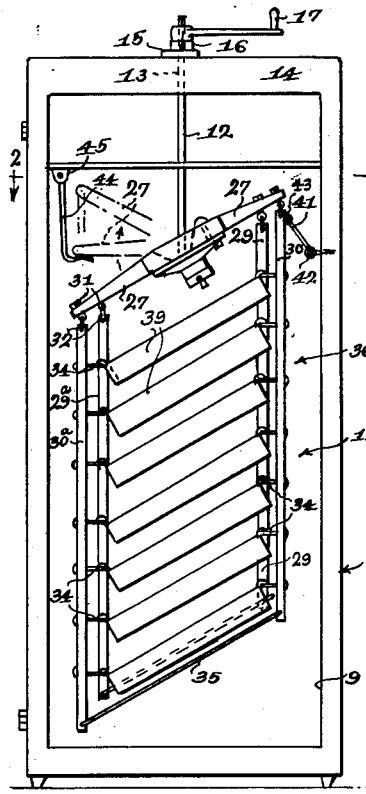
Fig. 1.
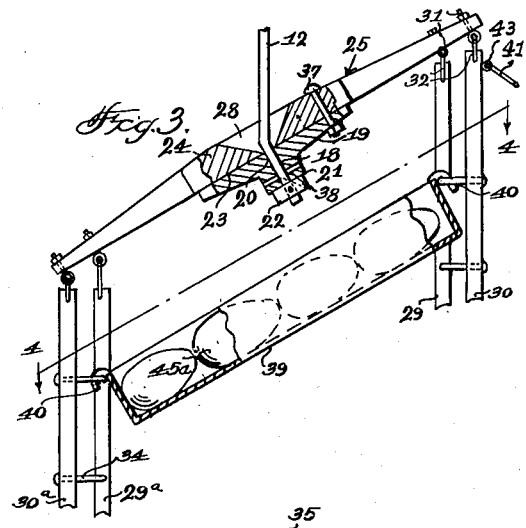
Fig. 3.
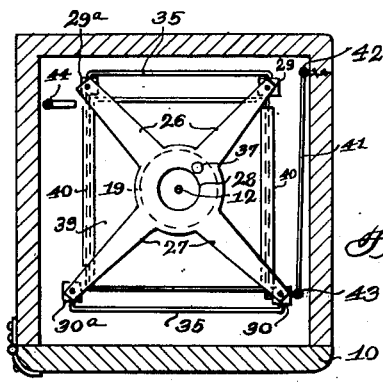
Fig. 2.
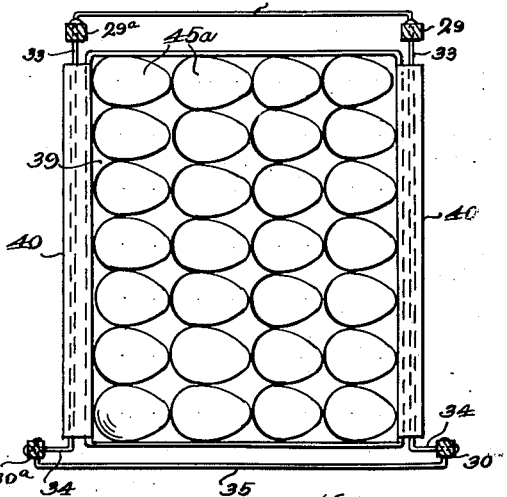
Fig. 4.
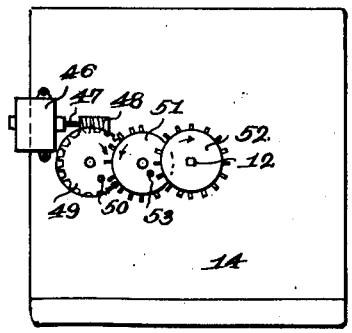
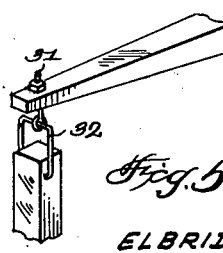
Fig. 5.
Fig. 6.
Inventor
ELBRIDGE W. FORNEY
By John N. Randolph
Attorney Patented Jan. 20, 1953

2,625,906

UNITED STATES PATENT OFFICE 2,625,906

EGG TURNING APPARATUS FOR INCUBATORS

Elbridge W. Forney, Fort Lauderdale, Fla.

Application February 28, 1951, Serial No. 213,186

10 Claims. (Cl. 119—44)

1

This invention relates to a novel device to be employed with incubators for accomplishing a universal rocking movement of a plurality of superposed egg trays whereby the corners of the egg trays will successively rise and descend to supply fresh albumen to the growing embryo or germ in each egg to produce proper muscular movement and development to the fowl inside the egg shell to avoid crippling of the fowl and sticking of the fowl to the egg shell.

Incubators are provided with apparatus for supporting a tier of egg trays and for rocking the egg trays back and forth in a seesaw-like motion. However, such a back and forth rocking movement does not accomplish the result of supplying fresh albumen to all parts of the growing embryo and as a result fresh albumen is supplied either only to the ends of the egg or only to the sides thereof. With applicant's invention, on the other hand, universal rocking movement of the trays and eggs contained therein causes each end and each side of the egg to at different times assume high and low positions so that fresh albumen is supplied to all parts of the egg.

A further object of the invention is to provide an apparatus of extremely simple construction including a universally oscillating tray supporting rack for accomplishing the universal oscillation of the tray and of the eggs contained therein.

Various other objects and advantages of the invention will hereinafter become more fully apparent from the following description of the drawing, illustrating presently preferred embodiments thereof, and wherein:

Figure 1 is a front elevational view of the apparatus;

Figure 2 is a horizontal sectional view thereof taken substantially along a plane as indicated by the line 2—2 of Figure 1;

Figure 3 is an enlarged fragmentary elevational view, partly in vertical section of the tray supporting and tilting apparatus;

Figure 4 is a horizontal sectional view thereof taken substantially along a plane as indicated by the line 4—4 of Figure 3;

Figure 5 is an enlarged fragmentary perspective view of a portion of the apparatus, and Figure 6 is a top plan view illustrating another means of actuating the tray supporting and tilting apparatus.

Referring more specifically to the drawing and first with reference to Figures 1 to 5, thereof a conventional upright incubator cabinet is illustrated in Figure 1 and designated generally 8 and includes an open front 9 normally closed by a door 10, as shown in Figure 2. For the purpose of illustrating the apparatus for rocking the eggs, designated generally 11, the cabinet 8 is shown in Figure 1 with the door 10 removed.

The apparatus for supporting and tilting the

2 egg trays includes a shaft 12 which extends vertically through an opening 13 in the top wall 14 of the cabinet 8 and which is disposed substantially centrally of the cabinet. The shaft 12 extends through a suitable thrust bearing 15 which is mounted on the upper side of the top wall 14. A thrust collar 16 is secured to the shaft 12 and rests upon and is turnable relatively to the bearing 15 and as will hereinafter become apparent, said thrust collar 16 supports the load borne by the shaft 12. A crank 17 is shown secured to the upper end of the shaft 12 above the collar 16; however, it will be understood that the crank 17, if desired, may be formed integral with and as a radial or lateral extension of the upper portion of said shaft. The shaft 12 is provided at its lower end with a portion 18 which is disposed at an oblique angle to the remainder of the shaft and which preferably forms an angle with the portion of the shaft 12 disposed thereabove greater than 135° but substantially less than 180°. A disk or plate forming a bearing member 19 has a central opening 20 through which the oblique shaft portion 18 loosely extends and the central portion of the underside of the plate or disk 19 may be enlarged to define a boss 21 to provide a longer bearing surface for the shaft portion 18. A collar forming a stop member 22 is adjustably mounted on the terminal of the shaft portion 18 and bears against the lower end of the boss 21. The disk or plate 19 is provided with a smooth flat upper surface 23 providing a bearing surface for the central or hub portion 24 of a spider-shaped head, designated generally 25 having a plurality, preferably four, post supporting arms 26 and 27 radiating therefrom and preferably spaced equally with respect to one another. A central opening 28 extends therethrough and which is flared from the bottom to the top of the hub to accommodate the lower part of the vertical portion of the shaft 12 during its rotary movement, as will hereinafter be described.

A pair of corresponding rear hanger posts 29 and 29a are suspended beneath and supported by the two rear arms 26 and a pair of front hanger posts 30 and 30a are suspended by and supported beneath the two front arms 27. Any suitable flexible connection may be provided between the posts and supporting arms, as for example as illustrated in Figure 5 including an eye bolt and nut 31 extending through and connected to each supporting arm and a bale pivotally connected to and rising from each post, as seen at 32, and pivotally connected to the bolt eye beneath the supporting arm. The posts 29 and 30 are connected by a plurality of tray supporting rods 33 which are arranged in vertically spaced relationship and each of which has an end extending through and anchored to the rear post 29 and a laterally projecting opposite end 34 which projects in a direction away from the post 30a and extends through and is anchored in the post 30. The posts 29a and 30a are similarly connected by a plurality of rods 33, 34 spaced the same distance apart. It will thus be seen that the rods 33, 34 prevent the posts 29 and 30 and the posts 29a and 30a from swinging toward or away from one another. The posts 29 and 29a and the posts 30 and 30a are also connected together adjacent their lower ends by rigid connecting links or rods 35 which function to prevent said posts from swinging toward or away from one another laterally of the cabinet 8, as illustrated in Figure 1. Accordingly, the head 25 in combination with the corner hanger posts, flexible means 31, 32, rods 33, 34 and rods 35 combine to form a tray supporting rack, designated generally 36.

As illustrated in Figure 3, a fastening extends detachably through the hub 24 and bearing member 19, as seen at 37 for keying the head 25 to the bearing member or plate 19 so that the shaft end 18 can revolve in the bore 20 relatively to the head 25 and bearing member or plate 19. If preferred, a smaller fastening may engage aligned openings in the shaft portion 18 and boss 21, as seen at 38 or if preferred the fastening 37 may be omitted and likewise the fastening connecting the disk 19 and shaft portion 18 and in no case are fastenings provided in both places, as the shaft 12 must always be free to revolve relatively to the supporting head 25 and the remainder of the rack 36.

The complementary rods 33, 34 are adapted to detachably support an egg tray 39 so that a plurality of egg trays are supported in a single tier in superposed relationship within the rack 36. The egg trays 39 are shown as being substantially square to substantially conform to the cross sectional shape of the rack 36 but the trays and rack may obviously be made rectangular, if desired. Each tray 39 is provided at opposite sides thereof with outwardly turned back rim portions forming downwardly opening hooks 40 which preferably extend substantially the length or width of the tray and which engage over the rod portions 33 for supporting the trays thereon. The rear posts 29 and 29a prevent the trays from sliding rearwardly of the rack as the rack is tilted and the rod portions 34 engage complementary ends of the hook portions 40 to prevent the trays from sliding forwardly of the rack 36. However, it will be readily apparent that the forwardly facing portions of the trays 39 may be lifted for removing them from the rods 33 and may be readily applied to said rods over the rod portions 34. Accordingly, the arms 27 are slightly longer than the arms 26 to space the hanger posts 30 and 30a a greater distance apart than the hanger posts 29 and 29a, so that the trays 39 may pass freely between the posts 30 and 30a but may not pass in a horizontal plane between the posts 29 and 29a.

An elongated link 41 which extends substantially from front to rear of the rack is anchored at one end at 42 to the inner side of the cabinet 8, near the rear thereof, and is pivotally connected at its opposite end at 43 to the front leg 30, for example, so that the link 41 can rock on both of its connections 42 and 43 to allow the leg 30 to rise and descend but to prevent the rack from revolving with the shaft 12. A hook forming a hanger member 44 is pivotally suspended at 45 within the cabinet 8 and is disposed so that its lower hook portion can be engaged under the arm of the rear post 29a, located opposite to the post 30 to which the link 41 is connected to maintain the rack in substantially a horizontal, at rest position and for supporting the rack while the trays are being applied thereto or removed therefrom.

Assuming that the rack 36 is filled with trays 39 each filled with eggs 45a to be hatched, and further assuming that the shaft end 18 is pointed downwardly toward the right rear hanger post 29. With the shaft end 18 thus disposed the arm 26 connected to the corner post 29 will be elevated and the arm 27 in diametrical alignment therewith will be inclined outwardly and downwardly while the other two aligned arms 26 and 27 will be in substantially the same horizontal plane. Accordingly, the right rear corner of each of the trays 39 will be elevated, the left front corner of each of said trays will be disposed in a lowered position and the right front and left rear corners will be disposed in substantially horizontal planes. Assuming that the crank 17 and shaft 12 are turned clockwise as seen in Figure 2 with the shaft end 18 turning relatively to the head 25 and either relatively to or with the disk 19, as the shaft end 18 swings toward the right front corner post 30 said corner post will be elevated while the right rear corner post 29 will descend, the left front corner post 30a will rise and the left rear corner post 29a will descend. When the shaft end 18 has moved through an arc of 90° and is facing toward the right front post 30 said post will be at the highest level and the opposite post 29a will be at the lowest level while the other corner posts 29 and 30a will be at the same level. This universal rocking movement of the rack 26 will thus continue as the shaft 18 continues to swing in a clockwise direction from the post 30 toward the post 30a, thereafter toward the post 29a and finally back to a position pointing toward the post 29 at the completion of a revolution of the shaft 12. It will thus be seen that during each revolution of the shaft 12 each corner and each side of each tray 39 will assume fully elevated, fully lowered and intermediate positions and likewise all of the eggs 45a will similarly be subjected to universal rocking motion in all directions. It is to be understood that the shaft 12 may be manually turned by the crank 17 and is ordinarily only turned a part of a revolution, as for example, through an arc of 90° and is only intermittently turned at time intervals usually a number of hours apart so that the complete revolution of the shaft 12 may occur only once within a period of one or several days. However, under certain circumstances it is desirable to turn the trays every few minutes and to various desired positions. As previously stated, the shaft end 18 can be turned to extend toward the post 30 and the left rear of the rack elevated to engage the hook 44 beneath the arm 26 which supports the post 29a for supporting the rack and all of the trays 39 in substantially horizontal planes in an "at rest" position in which the eggs 45a may be allowed to remain for any desired period of time and the rack is also thus held in a horizontal position while the trays 39 are applied thereto or removed therefrom.

In lieu of the manual crank 17 for turning the shaft 12, said shaft may be turned by a power driven means as illustrated in Figure 6 which may assume any desired form for turning the shaft at a very slow speed and intermittently. For example, an electric motor 46 is illustrated secured to the casing top 14 and having an armature shaft 47 provided with a worm 48 which drives a worm wheel 49. A pin 50 on the worm wheel 49 engages teeth or pins which project from the periphery of a wheel 51 so that the wheel 51, is provided with sixteen pins or teeth, for example, makes one revolution to each sixteen revolutions of the worm wheel 49. A corresponding wheel 52 which is fixed to the shaft 12 is driven by a pin 53 of the wheel 51 at the same ratio so that the shaft 12 turns at a very slow speed relatively to the armature shaft 47. Suitable means may be provided for intermittently driving the motor 46 for a predetermined period of time at predetermined time intervals for turning the wheel 52 and shaft 12 through a desired arc as for example 90°.

Obviously, the incubator cabinet 8 may be provided with suitable heating and air circulating means, not shown, and various other modifications and changes are likewise contemplated and may obviously be resorted to, without departing from the spirit or scope of the invention as hereinafter defined by the appended claims.

I claim as my invention:

1. An incubator apparatus comprising a rack provided with a head, a vertically disposed shaft extending loosely through and journaled in the center of said head and providing the sole support for said rack, said shaft having an oblique lower end portion extending downwardly from said head, a bearing member engaging said oblique shaft portion and disposed against the underside of the head, a stop member secured to the oblique shaft portion and supporting the bearing member thereon, a post pivotally suspended from each corner of said head including front and rear corner posts, tray supporting rods extending between and connected to complementary front and rear corner posts, and egg containing trays supported in superposed relationship in said rack on said tray supporting rods, said shaft being rotatable relatively to the head whereby the corners of the head will be successively elevated for universally rocking the rack and trays.

2. An incubator rack as in claim 1, and means operatively connected with said shaft for intermittently revolving said shaft.

3. An incubator rack as in claim 1, anchoring means operatively connected with said rack for holding said rack against rotation with the shaft, a connecting link connecting the front corner posts and a connecting link connecting the rear corner posts, said connecting links combining with said tray supporting rods to retain the corner posts in parallel relationship to one another during their vertical reciprocating movement.

4. An incubator rack as in claim 1, and a hanger member detachably engaging a corner of said head and combining with the bearing member and angular shaft end to support the rack with the trays in a horizontal position for applying the trays to or removing the trays from the rack and for maintaining the trays and eggs contained therein in a horizontal, at rest position.

5. An incubator rack as in claim 1, and intermittently driven means connected to said shaft including speed reduction gearing for intermittently turning the shaft at a very slow speed.

6. A structure as in claim 1, an incubator casing in which said rack is disposed having a top wall through which the upper portion of the shaft extends and in which it is journaled, and bearing means for suspending the shaft from the top wall of the casing.

7. An incubator apparatus comprising a rack provided with a head, a post pivotally suspended from each corner thereof including front and rear corner posts, a plurality of superimposed spaced tray supporting rods extending between and supported at their ends by complementary front and rear corner posts, a plurality of superimposed egg containing trays supported in the rack on said spaced supporting rods of the four corner posts, a vertically disposed rotary shaft extending loosely through and journaled in the central portion of the head having a bearing member connected to the lower end thereof provided with a flat top surface bearing flush against the underside of the head and on which said head is supported, said top surface of the bearing member being disposed at an angle to the axis of the shaft for supporting the head in an inclined position, said shaft and bearing member being rotatable relatively to the head whereby the head will be rocked for successively raising and lowering each corner thereof to cause the corner posts to be successively elevated and lowered.

8. An incubator rack as in claim 7, and means connected to said rack and permitting rocking movement thereof and preventing rotation of the rack with the shaft.

9. An incubator rack as in claim 7, said tray supporting rods each having a rear end extending through and anchored in a rear corner post and a laterally turned outwardly extending forward end anchored to a front corner post, said trays each having outwardly and downwardly turned oppositely disposed rim portions forming hook members engaging over said tray supporting rods between the rear corner posts and their laterally turned forward ends and retained thereby on said rods.

10. An incubator apparatus comprising a tray supporting rack having upright corner posts including front and rear corner posts, a rack element pivotally connected to said corner posts, a plurality of superimposed tray supporting rods extending between and connected to the complementary front and rear corner posts, a plurality of egg containing trays supported on said tray supporting rods, and rotary means rotatably connected to the rack element including a rotary bearing member having an inclined surface rotatably engaging against a side of the rack element for imparting a universal rocking movement thereto for successively displacing the corner posts vertically to impart an up and down movement thereto whereby a tier of trays supported in said rack will be subjected to the universal oscillating motion for successively raising and lowering each corner and each side of each tray.

ELBRIDGE W. FORNEY.

REFERENCES CITED

The following references are of record in the file of this patent:

UNITED STATES PATENTS

| Number | Name | Date |
|---|---|---|
| 1,263,138 | Smith | Apr. 16, 1918 |
| 1,647,786 | Davis | Nov. 1, 1927 |
| 1,893,153 | Sturgis | Jan. 3, 1933 |
| 2,170,789 | Smith | Aug. 22, 1939 |
| 2,215,664 | Gedge | Sept. 24, 1940 |